(12) United States Patent
Yao

(10) Patent No.: US 7,445,418 B2
(45) Date of Patent: Nov. 4, 2008

(54) VAN SEMI-TRAILER AND METHOD FOR SHIPPING THE SAME

(75) Inventor: Gavin Yao, Guangdong (CN)

(73) Assignees: China International Marine Containers (Group) Ltd., Guangdong (CN); Guangdong Xinhui CIMC Special Transportation Equipment Co., Ltd, Guangdong (CN)

( * ) Notice: Subject to any disclaimer, the term of this patent is extended or adjusted under 35 U.S.C. 154(b) by 0 days.

(21) Appl. No.: 11/846,833

(22) Filed: Aug. 29, 2007

(65) Prior Publication Data

US 2008/0145169 A1      Jun. 19, 2008

(30) Foreign Application Priority Data

Dec. 13, 2006    (CN) .......................... 2006 1 0157603

(51) Int. Cl.
*B60P 7/08*          (2006.01)
(52) U.S. Cl. ........................... 414/802; 410/32; 410/54; 410/56; 410/68
(58) Field of Classification Search ................... 410/31, 410/32, 46, 54, 56, 57, 68, 78, 129; 414/788.1, 414/801, 802; 220/1.5
See application file for complete search history.

(56) References Cited

U.S. PATENT DOCUMENTS 6,877,939 B2 *   4/2005   Tomkins et al. ............... 410/46

\* cited by examiner

*Primary Examiner*—Stephen Gordon
(74) *Attorney, Agent, or Firm*—The Webb Law Firm

(57) ABSTRACT

A van semi-trailer and a method for shipping the same are provided. The van semi-trailer comprises: a van body; wheels and a leg at the bottom surface of the van body; bottom corner fittings at the bottom surface of the van body; top corner fittings provided on top surface of the van body and respectively aligned with access holes penetrating through the top surface of the van body; and auxiliary supporters inside the van body, wherein each auxiliary supporter has a lower end connected to a base frame of the van body and an upper end aligned with the respective access hole and connected to the respective top corner fitting. Therefore, it is possible to ship the van semi-trailer, while the original structure of the van semi-trailer is maintained substantially and the manufacture difficulty is not increased; the auxiliary supporters may be manufactured at low cost, easily implemented and recycled.

10 Claims, 6 Drawing Sheets

VAN SEMI-TRAILER AND METHOD FOR SHIPPING THE SAME

FIELD OF INVENTION

The present invention relates to a van semi-trailer and a method for shipping the same, in particularly to a van semi-trailer which can be lifted and stacked during transportation and storage of the van semi-trailer and a method for shipping the same.

BACKGROUND OF THE INVENTION

North American van semi-trailer is designed and manufactured according to AAR (Association of American Railroads) M931 standard, wherein the North American van semi-trailer is an enclosed van body, one end of the bottom surface of which is provided with two or three pairs of wheels, the other end of the bottom surface of which is provided a leg for supporting the van body. When transporting the van semi-trailer, the end provided with the leg is connected to a specific tractor and the leg is retracted upward, thereby the van semi-trailer can be transported by means of the driving power of the tractor.

Since the van semi-trailer is directly connected to the tractor during the transportation of the van semi-trailer, it is not necessary to stack a plurality of the van bodies and move them through other modes, thereby such a van semi-trailer has a quite simple structure. As shown in FIGS. 2-5, the van body typically only comprises a base frame 11 in a rectangular skeleton form, four upstanding posts 12 extending upwards from the four corners of the base frame 11, two top longitudinal beams 14 connected with the four upstanding posts 12 along the length direction of the van body at the top of the van body, a plurality of top transverse beams 13 connected between the two longitudinal beams 14, and a front wall panel 15, a door panel 16, side panels 17 and a top panel for defining the enclosed van body from the front, rear, side and top directions, respectively. Other parts below the base frame 11, such as wheels 19, a leg 18, a mud baffle 10, and so on, belong to detachable parts.

The North American van semi-trailer is mainly and widely applied in the inland region of North America. However, in the field of van semi-trailer, it is an important and difficult problem to transport van semi-trailers in batches from a manufacture site to a use site, for example from other regions out of the North America to inland region of the North America.

The first considered factor with respect to above problem is about the cost of transportation of the van semi-trailers. At present, it is the lowest cost and most convenient way to transport the semi-trailers by ship. Although other alternative modes may be available, these alternative modes involve very high cost of transportation, thereby it is not advantageous for these alternative modes in competitive with the manufacture of the van semi-trailer in the use site (i.e. inland region of the North America). Therefore, when the van semi-trailers are transported by means of ships and docks in current movement or storage modes, it still is bottleneck problem how to transport van semi-trailers from a manufacturing site to a use site.

At present, container transportation ships and corresponding facilities in dock, such as a tower crane, are manufactured and equipped according to ISO1496 for the standard container. When containers arrive at a harbor, the containers will be lifted and moved by the tower crane by connecting the top of each container, so as to put each container onto a ship and stack to a certain height according to the requirement of load-distribution of ship. Therefore, in order to transport the containers by ship, the requirements of the lifting devices and a certain stacking property of the containers shall be met. As shown in FIG. 1, an ultra-long North American container 1' has two parallel stack frames 11' which are spaced at prescribed interval along the length direction of the container and receive the load from another stacked container; top corner fittings 12' and bottom corner fittings 13' in conformity with the ISO standard are provided at the top portion and the bottom portion of the stack frames 11', respectively; four lift holes are formed in the four top corner fittings 12' respectively, four stack holes are formed in the four bottom corner fittings 13' respectively. According to the standard size of the tower crane, the distance between two lift holes along the length direction of the container is 11,989 mm or 5,855 mm, and the distance between two lift holes along the width direction of the container is 2,260 mm.

However, as for the current van semi-trailer, the structure of the current van semi-trailer has not a necessary design on a stack frame, stack holes and lift holes, and thereby this structure can not meet the requirements of lifting and fixing in dock and on ship.

SUMMARY OF THE INVENTION

In view of the above problem in prior art, one object of the present invention is to provide a method for shipping a van semi-trailer, which maintains the original structure and property of van body of the van semi-trailer substantially and may be lifted and stacked by current ship and facilities in dock.

Another object of the present invention is to provide a van semi-trailer, which maintains the original structure and property of van body of the van semi-trailer substantially and may be lifted and stacked by current ship and facilities in dock.

To achieve the one object of the present invention and according to an aspect of the present invention, the present invention provides a method for shipping a van semi-trailer, the method comprises steps of: forming a plurality of the access holes penetrating through top surface of a van body of the van semi-trailer; providing a plurality of top corner fittings on the top surface of the van body and respectively aligned with the plurality of the access holes; providing a plurality of bottom corner fittings on bottom surface of the van body; detaching a leg and wheels provided on the bottom surface of the van body before transportation; providing a plurality of auxiliary supporters inside the van body, aligning an upper end of each auxiliary supporter with the respective access hole, connecting the upper end of the each auxiliary supporter to the respective top corner fitting via the respective access hole and connecting a lower end of the each auxiliary supporter to a base frame of the van body; lifting the van body by means of the plurality of top corner fittings; and stacking a plurality of van bodies by the plurality of top corner fittings and the plurality of bottom corner fittings of each van body so as to store and ship the plurality of van bodies.

To achieve the another object of the present invention and according to another aspect of the present invention, the present invention provides a van semi-trailer, the van semi-trailer comprises a van body; wheels provided at one end of bottom surface of the van body; a leg provided at another end of the bottom surface of the van body; a plurality of bottom corner fittings provided at the bottom surface of the van body; a plurality of top corner fittings provided on top surface of the van body and respectively aligned with a plurality of access holes penetrating through the top surface of the van body; and a plurality of auxiliary supporters provided inside the van body, wherein each auxiliary supporter has a lower end which is connected to a base frame of the van body and an upper end which is aligned with the respective access hole and connected to the respective top corner fitting.

According to the van semi-trailer and the method for shipping the same of the present invention, preferably, each of the plurality of access holes is provided in a respective top transverse beam of the van body.

According to the van semi-trailer and the method for shipping the same of the present invention, preferably, the number of the plurality of access holes is four.

According to the van semi-trailer and the method for shipping the same of the present invention, preferably, the four top corner fittings respectively aligned with the four access holes are arranged in a rectangular form, each top corner fitting has a lift hole, a distance between centers of lift holes of two top corner fittings along a length direction of the rectangular form is 5,855 mm or 11,989 mm, and a distance between centers of lift holes of two top corner fittings along a width direction of the rectangular form is 2,260 mm.

According to the van semi-trailer and the method for shipping the same of the present invention, preferably, the number of the plurality of bottom corner fittings is four.

According to the van semi-trailer and the method for shipping the same of the present invention, preferably, the four bottom corner fittings are arranged in a rectangular form, each bottom corner fitting has a stack hole, a distance between centers of stack holes of two bottom corner fittings along a length direction of the rectangular form is 5,855 mm or 11,989 mm, and a distance between centers of stack holes of two bottom corner fittings along a width direction of the rectangular form is 2,260 mm.

According to the van semi-trailer and the method for shipping the same of the present invention, preferably, the connection between the lower end of the each auxiliary supporter and the base frame of the van body is detachable, and the connection between the upper end of the each auxiliary supporter and a respective access hole is detachable.

According to the van semi-trailer and the method for shipping the same of the present invention, preferably, each auxiliary supporter comprises: two inclined pull rods, top ends of which are joined together at thereof so as to insert into a respective access hole; and bottom ends off which are respectively connected to the base frame of the van body; and a support rod connected between the two inclined pull rods.

According to the van semi-trailer and the method for shipping the same of the present invention, preferably, each of the two inclined pull rods comprises: an upper pull rod inserted into the respective access hole; a lower pull rod connected to the base frame of the van body; and an adjusting sleeve connected between the upper pull rod and the lower pull rod.

According to the van semi-trailer and the method for shipping the same of the present invention, preferably, a lower pull rod is connected to the base frame of the van body via an install hole which is formed in a floor plate of the base frame.

In connection to the van semi-trailer and the method for shipping the same according to the present invention, the technical effects are as follows:

Based on the plurality of auxiliary supporters which are provided inside van body and connected to the respective top corner fittings through the respective access holes, the rigidity of each van body may be assured, thereby, the auxiliary supporters of the van body may transfer and sustain weight of the van body during lifting the van body; at the same time, the auxiliary supporters of one van body may transfer and sustain weight of another van body during stacking the plurality of van bodies.

Top corner fittings and bottom corner fittings are additionally amounted on the van body so as to facilitate the lift and stack of the van semi-trailer during the transportation and storage thereof.

Since the auxiliary supporters of the van body are detachable and the access holes may be blocked after the van bodies are transported to a target site, the original structure of the van body will be maintained so as to be generally used as a normal van semi-trailer.

The auxiliary supporters of the van body can be folded and recycled so as to reduce the cost of the transportation of the van bodies.

As can be seen from the above, with the van semi-trailer and the method for shipping the same according to the present invention, it is possible to ship the conventional van semi-trailer which does not have property of stacking and lifting in the manner that the original structure of the van semi-trailer is maintained substantially and the difficulty in the manufacture process is not increased; the auxiliary supporters may be manufactured at low cost, easily implemented and recycled.

BRIEF DESCRIPTION OF THE DRAWINGS

The accompanying drawings, which are included to provide a further understanding of the invention and incorporated in and constitute a part of this specification, illustrate embodiments of the invention and together with the description serve to explain the principles of the invention.

DETAILED DESCRIPTION OF THE PREFERRED EMBODIMENT

Figure 1:
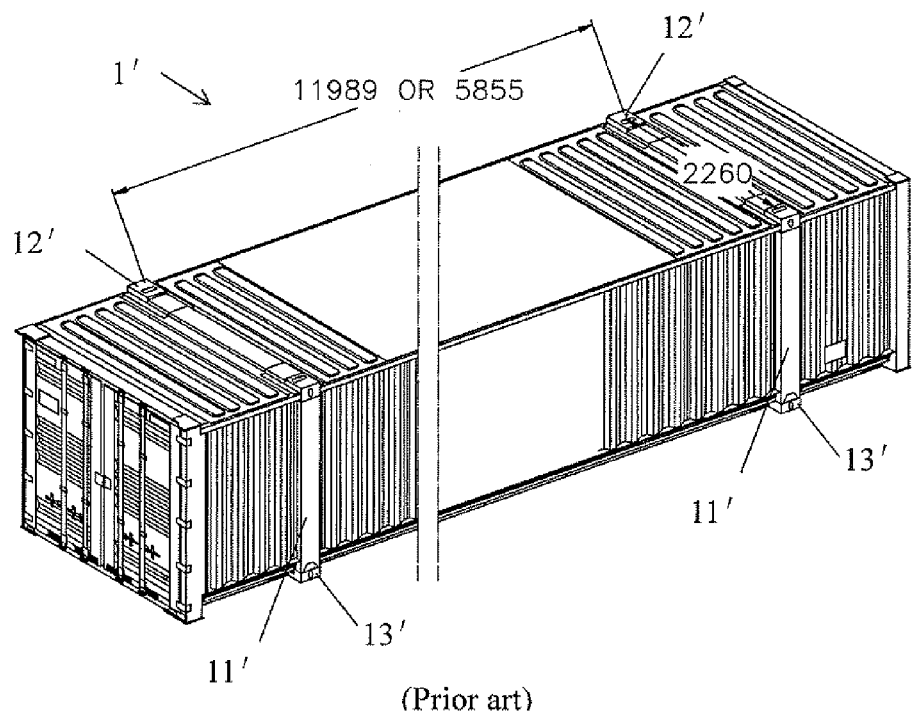
FIG. 1 is a structure diagram of an American overlong container in the prior art.
Figure 2:
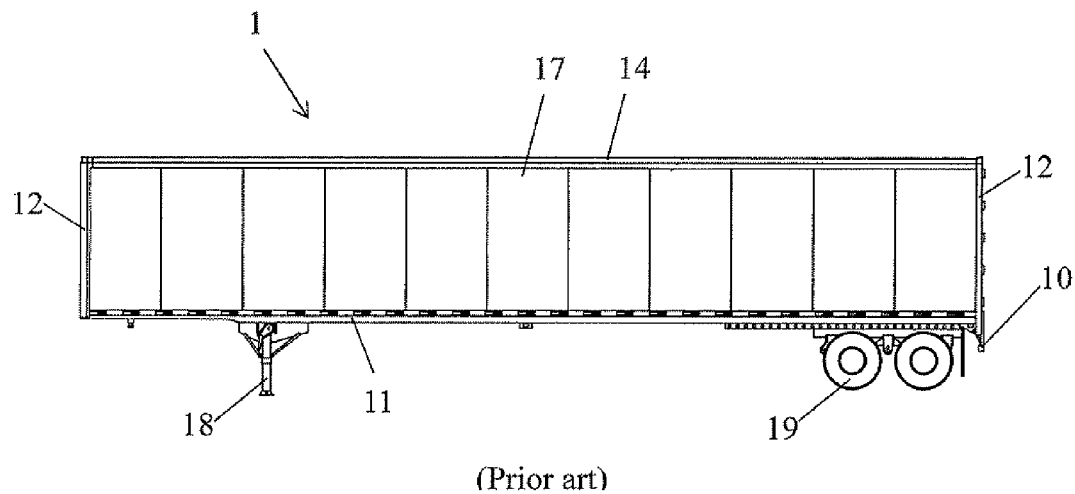
FIG. 2 is a front view of a van semi-trailer in the prior art.
Figure 3:
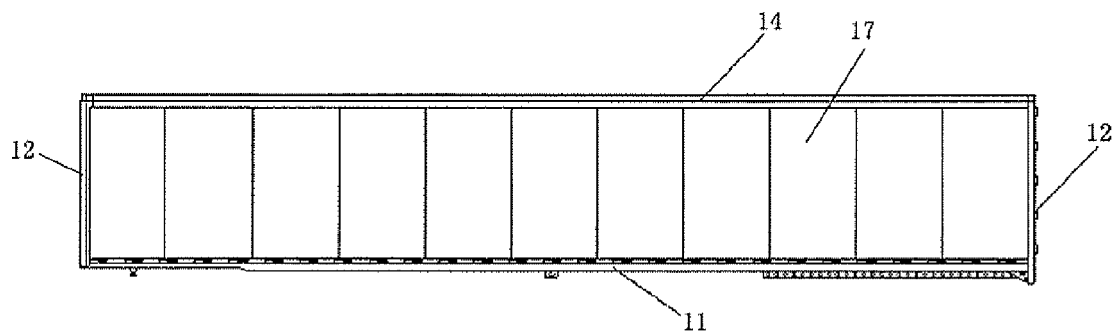
FIG. 3 is a front view of the van semi-trailer shown in FIG. 2 after detachable components are detached.
Figure 4:
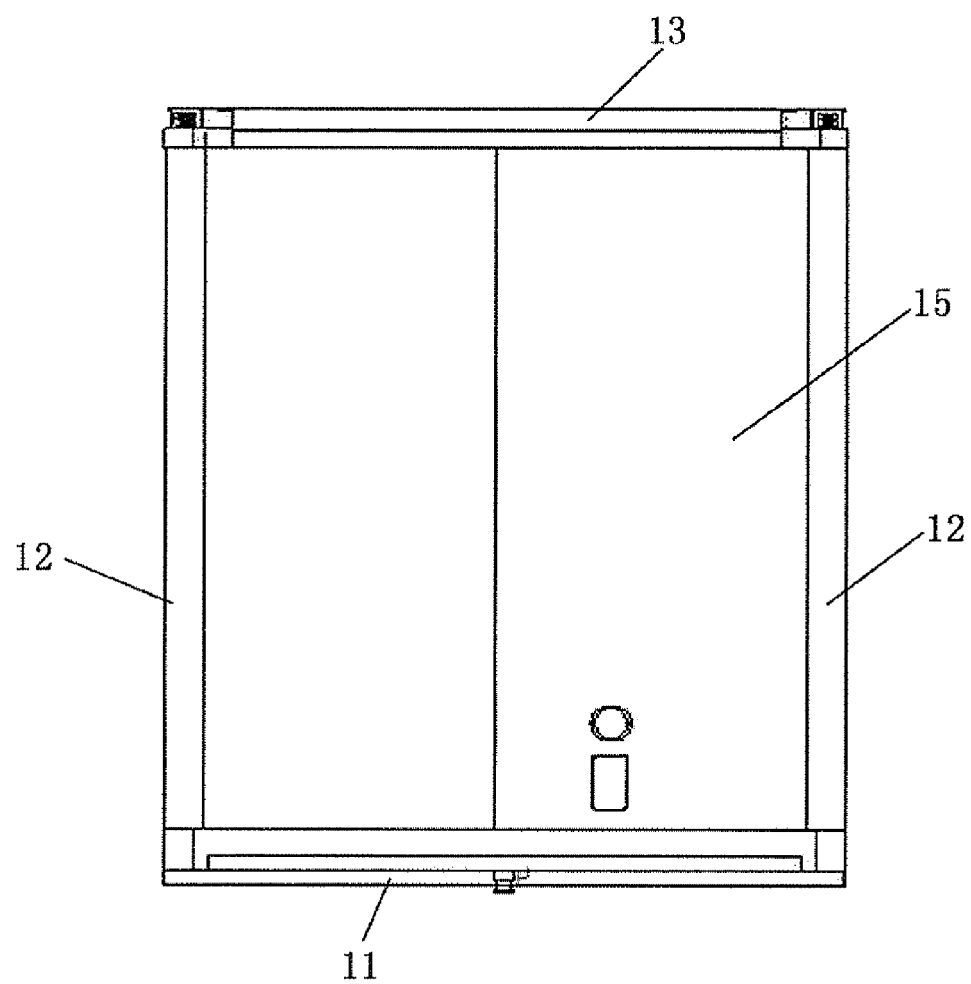
FIG. 4 is a left view of the van semi-trailer shown in FIG. 3.
Figure 5:
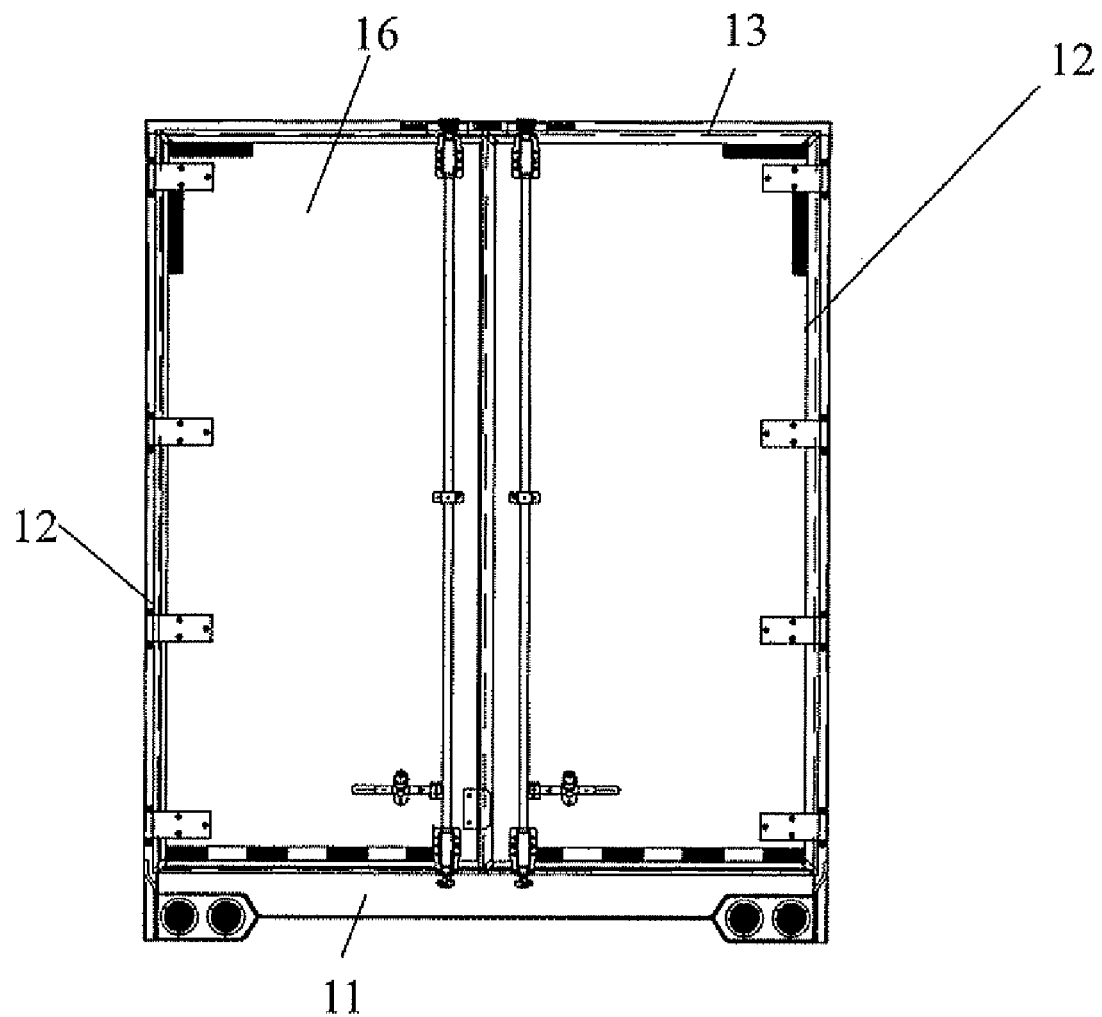
FIG. 5 is a right view of the van semi-trailer shown in FIG. 3.

Reference will now be made in detail to the preferred embodiments of a van semi-trailer and a method for shipping the same according to the present invention, examples of which are illustrated in the accompanying drawings.

According to an aspect of the present invention, the present invention provides a van semi-trailer.

In an embodiment of the present invention, a van semi-trailer has a structure similar to the conventional van semi-trailer 1 of the prior art shown in FIGS. 2-5, which comprises a van body, wheels 19 and a leg 18 respectively provided at one end and the other end of the bottom surface of the van body, and auxiliary supporters 2 detachably provided inside the van body. The wheels 19 may be several pairs as required.

Similarly, the van body comprises a base frame 11 in a rectangular skeleton form, four upstanding posts 12 extending upwards from the four corners of the base frame 11, two top longitudinal beams 14 along the length direction of the van body connected with top end of the four upstanding posts 12, a plurality of top transverse beams 13 connected between the two longitudinal beams 14, and a front wall panel 15, a door panel 16, side panels 17 and a top panel for defining an enclosed the van body from the front, rear, side and top directions.

For the van semi-trailer according to the present invention, as shown in FIGS. 6-10, four access holes 131 for use in transportation of the van body penetrate through the respective top transverse beams 13 of the van body, and are arranged in a rectangular form; four top corner fittings 3 aligned with the four access holes 131 are provided on the respective top transverse beams 131 and arranged in a rectangular form, each top corner fitting 3 has a lift hole; the distance L between centers of lift holes of two top corner fittings 3 along the length direction of the rectangular form is 5,855 mm or 11,989 mm, and the distance W between centers of lift holes of two top corner fittings 3 along the width direction of the rectangular form is 2,260 mm. Moreover, it is allowable for the above distances to have certain reasonable tolerance which still is required to match the standard size of container tower crane.

Four bottom corner fittings 4, which are aligned with the four top corner fittings 3, are provided on the base frame 11 and arranged in a rectangular form. Each bottom corner fitting 4 has a stack hole, the distance between centers of stack holes of two bottom corner fittings 4 along the length direction of the rectangular form is 5,855 mm or 11,989 mm, and the distance between centers of stack holes of two bottom corner fittings 4 along the width direction of the rectangular form is 2,260 mm. Moreover, it is allowable for the above distances to have certain reasonable tolerance which still is required to match the standard size of stacked containers.

In the above embodiment, the top corner fittings 3 and the bottom corner fittings 4 meet the requirement of ISO1496.

Figure 8:
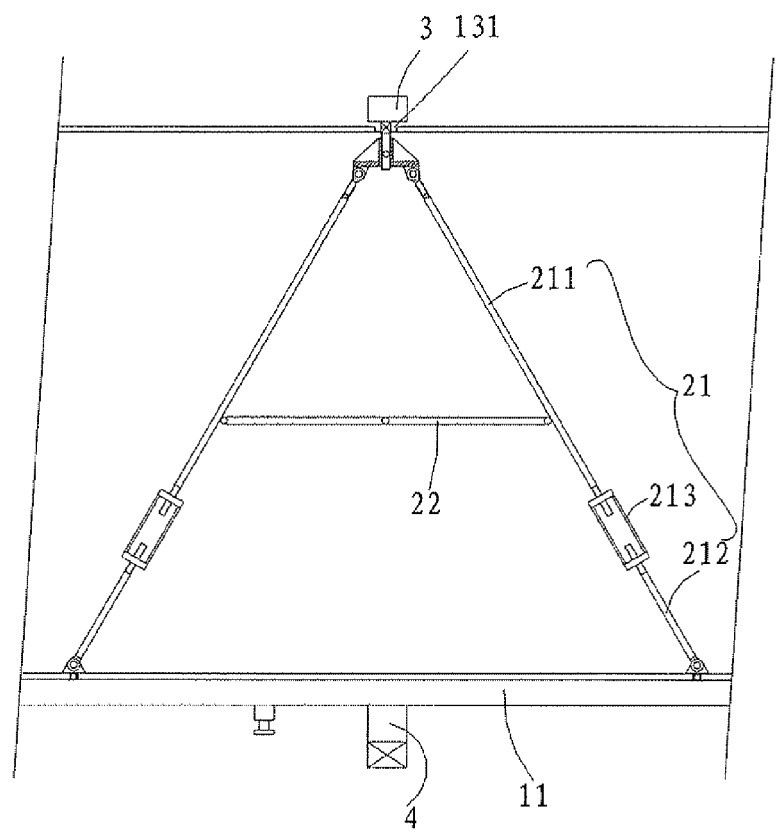
FIG. 8 is a sectional view taken along A-A line of FIG. 7 as viewed from the same direction as FIG. 3, and illustrating the structure of the auxiliary supporter according to the present invention.
Figure 9:
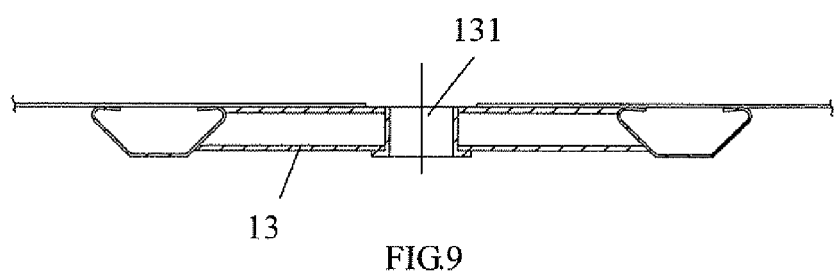
FIG. 9 is a sectional view of an access hole provided in a top transverse beam.
Figure 10:
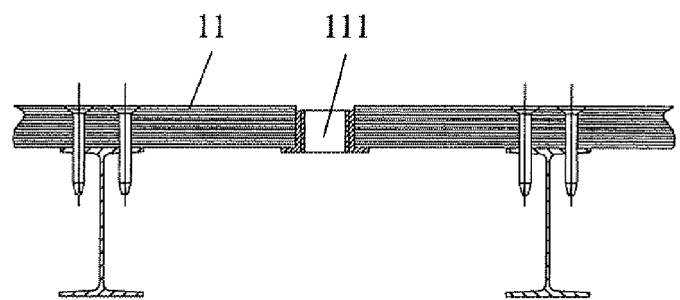
FIG. 10 is a sectional view of an install hole provided in floor of a base frame of the van body.

As shown in FIG. 8, each auxiliary supporter 2 has an upper end which is inserted into a respective access hole 131 and connected to a respective top corner fitting 3, and a lower end which is connected to a floor of a base frame 11. Alternatively, as shown in FIGS. 6 and 10, the lower end of each auxiliary supporter 2 may be connected to and fixed by an apparatus provided in an install hole which is formed in the floor plate of the base frame 11.

Figure 6:
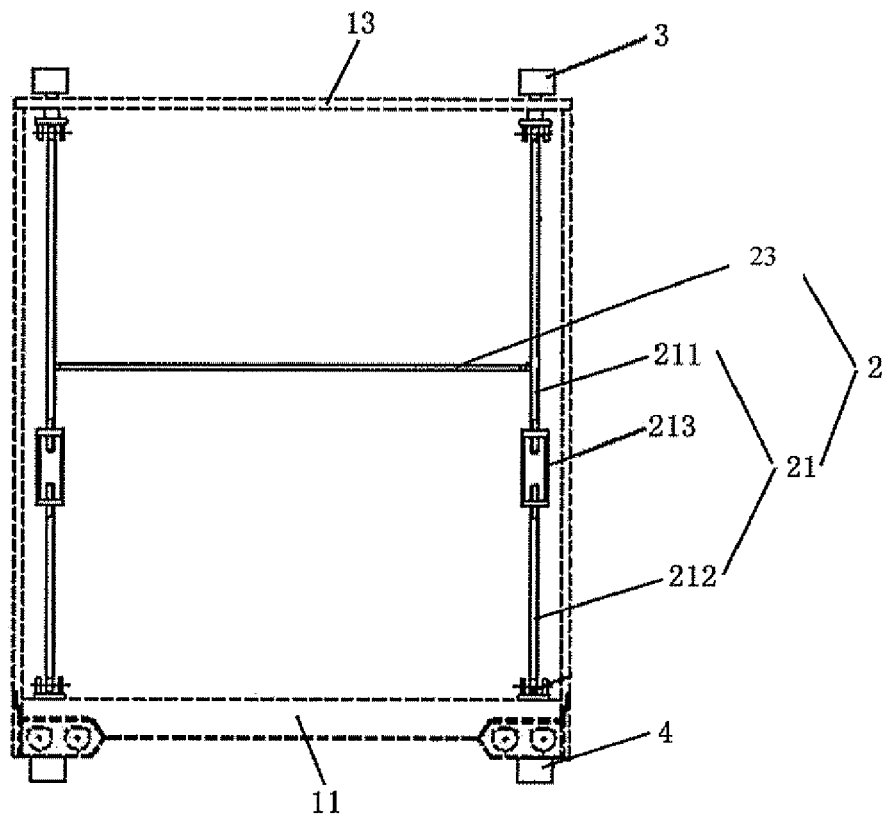
FIG. 6 is a cross sectional view of a van body of a van semi-trailer according to the present invention after auxiliary supporters are provided inside the van body as viewed from the same direction as FIG. 5, in which the dot line is representative of the van body of the van semi-trailer.
Figure 7:
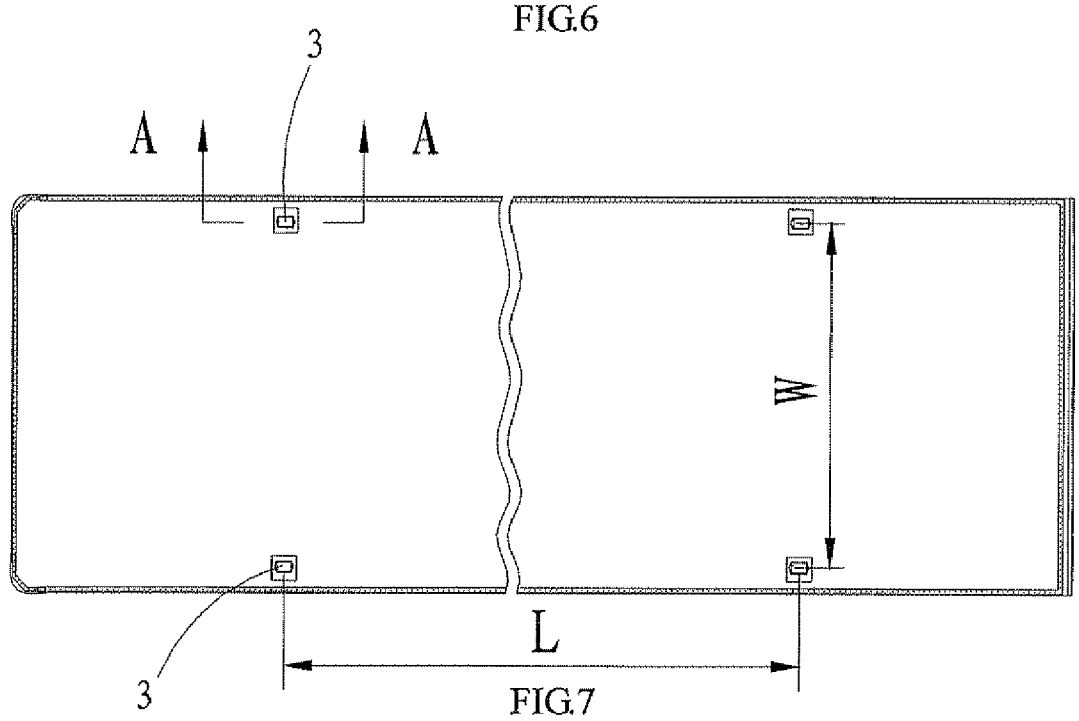
FIG. 7 is a top view of the van body of the van semi-trailer shown in FIG. 6.

As shown in FIGS. 6 and 8, each auxiliary supporter 2 comprises two inclined pull rods 21 and a support rod 22, wherein top ends of two inclined pull rods 21 are joined together so as to insert into one respective access hole 131, and bottom ends of two inclined pull rods 21 are respectively connected to the floor plate of the base frame 11 of the van body; the support rod 22 is connected between the two inclined pull rods 21, preferably, the support rod 22 is connected between the middle portions of the two inclined pull rods 21 so as to improve load-carrying ability of each auxiliary supporter 2. In an preferable embodiment of the auxiliary supporter 2, each inclined pull rod 21 may comprise: an upper pull rod 211, top end of which is inserted into a respective access hole 131, a lower pull rod 212, bottom end of which is connected to the floor plate of the base frame 11 of the van body, and an adjusting sleeve 213, two ends of which are screwedly connected between a bottom end of the upper pull rod 211 and a top end of the lower pull rod 212. The adjusting sleeve 213 is used to adjust the whole length of the inclined pull rod 21, so as to assure the installation and the rigidity and strength of each auxiliary supporter 2 in the van body. Moreover, in order to improve load-carrying ability of auxiliary supporters 2, preferably, reinforce rods 23 may be connected to a plurality of auxiliary rods 2 in desired manner.

Figure 11:
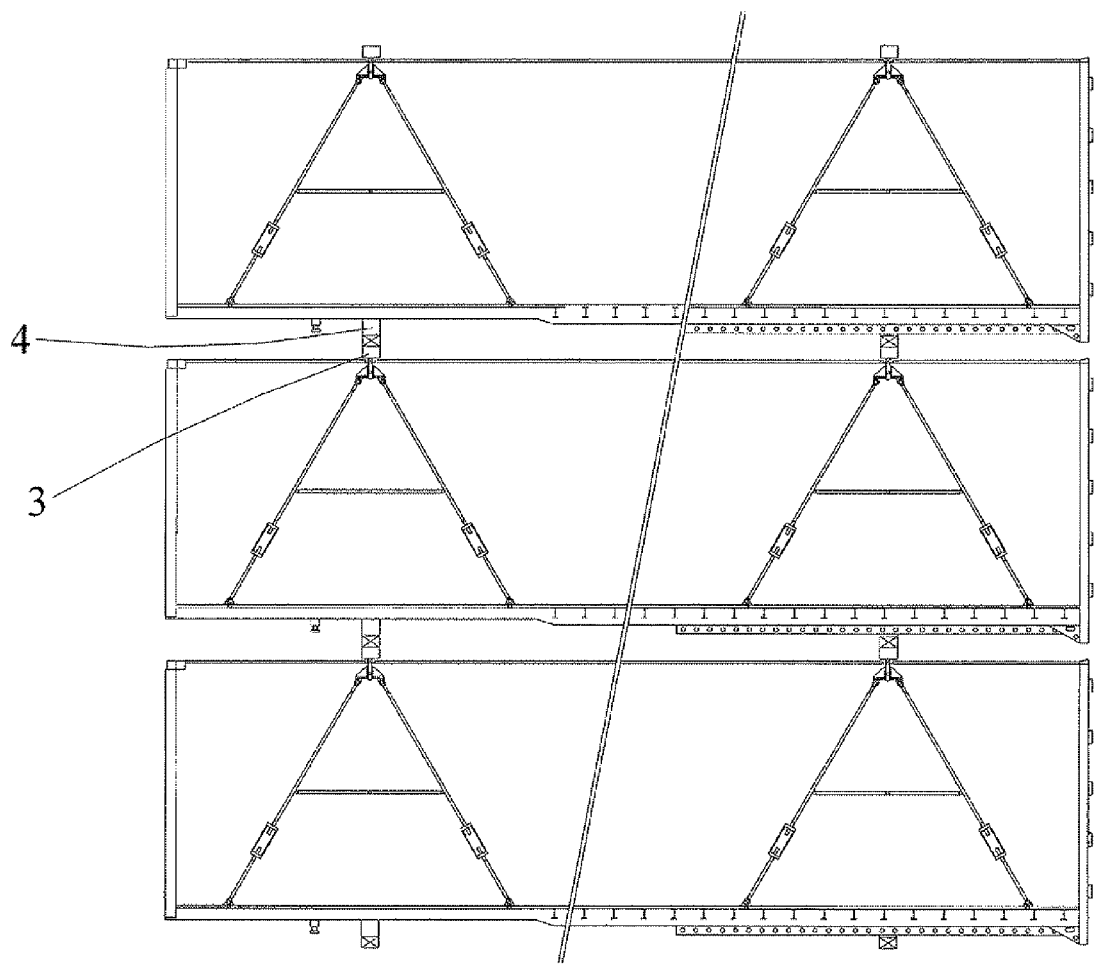
FIG. 11 is a diagram illustrating the stacking state of a plurality of van semitrailers according to the present invention.

According to an aspect of the present invention, the present invention further provides a method for shipping the above van semi-trailer with reference to FIG. 11.

The method for shipping the van semi-trailer according to the present invention, comprises steps of: forming a plurality of the access holes 131 penetrating through top surface of the van body; providing a plurality of top corner fittings 3 on the top surface of the van body and respectively aligned with the plurality of the access holes 131; providing a plurality of bottom corner fittings 4 on the bottom surface of the van body; detaching the leg 18 and wheels 19 provided at the bottom surface of the van body before transportation; providing a plurality of auxiliary supporters 2 inside the van body, aligning an upper end of each auxiliary supporter 2 with the respective access hole 131, connecting the upper end of the each auxiliary supporter 2 to the respective top corner fitting 3 via a respective access hole 131 and connecting a lower end of the each auxiliary supporter 2 to the base frame 11 of the van body; lifting the van body by the plurality of top corner fittings 3; stacking a plurality of van bodies by the connection between the plurality of bottom corner fittings 4 of upper van body connected and the plurality of top corner fittings 3 of lower van body via twist lock, so as to store and transport the plurality of van bodies; and detaching the plurality of auxiliary supporters 2 and blocking the plurality of access holes 131 after the plurality of van bodies are transported to a target site.

In the present invention, the technical effects will be described as follows.

Based on the plurality of auxiliary supporters which are provided inside van body and connected to the respective top corner fittings via the respective access holes, the rigidity of each van body may be assured, thereby, the auxiliary supporters of the van body may transfer and sustain weight of the van body during lifting the van body; at the same time, the weight of one van body may be transferred and sustained by the auxiliary supporters of another van body during stacking the plurality of van bodies. Top corner fittings and bottom corner fittings are additionally amounted on the van body so as to facilitate the lift and stack of the van semi-trailer during the transportation and storage thereof. Since the auxiliary supporters of the van body are detachable and the access holes may be blocked after the van bodies are transported to a target site, the original structure of the van body will be still maintained substantially so as to be generally used as a normal van semi-trailer, and auxiliary supporters of the van body can be folded and recycled so as to reduce the cost of the transportation of the van bodies.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for shipping a van semi-trailer, comprising steps of:
   forming a plurality of the access holes penetrating through a top surface of a first van body of the van semi-trailer;
   providing a plurality of top corner fittings on the top surface of the van body and respectively aligned with the plurality of the access holes;
   providing a plurality of bottom corner fittings on a bottom surface of the van body;
   detaching a leg and wheels provided on the bottom surface of the van body before transportation;
   providing a plurality of auxiliary supporters inside the van body, aligning an upper end of each auxiliary supporter with a respective one of said access holes, connecting the upper end of the each auxiliary supporter to the respective top corner fitting via the respective access hole and connecting a lower end of the each auxiliary supporter to a base frame of the van body;
   lifting the van body by means of the plurality of top corner fittings; and
   stacking a plurality of van bodies, which are similar in construction to the first van body and include the first van body, by the respective plurality of top corner fittings and the plurality of bottom corner fittings of each van body so as to store and ship the respective plurality of van bodies.

2. The method according to claim 1, wherein each of the plurality of access holes is provided in a respective top transverse beam of the van body.

3. The method according to claim 1, wherein the number of the plurality of access holes is four.

4. The method according to claim 3, wherein the number of the plurality of top corner fittings of the first van body is four, the four top corner fittings are respectively aligned with the four access holes and are arranged in a rectangular form, each top corner fitting of the four top corner fittings has a lift hole, a distance between centers of respective ones of said lift holes of two of the four top corner fittings along a length direction of the rectangular form is 5,855 mm or 11,989 mm, and a distance between centers of respective ones of said lift holes of two of the four top corner fittings along a width direction of the rectangular form is 2,260 mm.

5. The method according to claim 1, wherein the number of the plurality of bottom corner fittings of the first van body is four.

6. The method according to claim 5, wherein the four bottom corner fittings are arranged in a rectangular form, each bottom corner fitting of the four bottom corner fittings has a stack hole, a distance between centers of respective ones of said stack holes of two of the four bottom corner fittings along a length direction of the rectangular form is 5,855 mm or 11,989 mm, and a distance between centers of respective ones of said stack holes of two of the four bottom corner fittings along a width direction of the rectangular form is 2,260 mm.

7. The method according to claim 1, wherein the connection between the lower end of the each auxiliary supporter and the base frame of the van body is detachable, and the connection between the upper end of the each auxiliary supporter and the respective top fitting via respective access hole is detachable.

8. The method according to claim 1, wherein each auxiliary supporter comprises:
   two inclined pull rods, top ends of which are joined together so as to insert into one respective access hole of said plurality of access holes, and bottom ends of which are respectively connected to the base frame of the van body; and
   a support rod connected between the two inclined pull rods.

9. The method according to claim 8, wherein each of the two inclined pull rods comprises:
   an upper pull rod inserted into the respective access hole;
   a lower pull rod connected to the base frame of the van body; and
   an adjusting sleeve connected between the upper pull rod and the lower pull rod.

10. The method according to claim 9, wherein the lower pull rod is connected to the base frame of the van body via an install hole which is formed in a floor plate of the base frame.

* * * * *